Aug. 21, 1956 C. F. LAUENSTEIN 2,759,595
BELT CONVEYOR
Filed Sept. 24, 1951 4 Sheets-Sheet 1
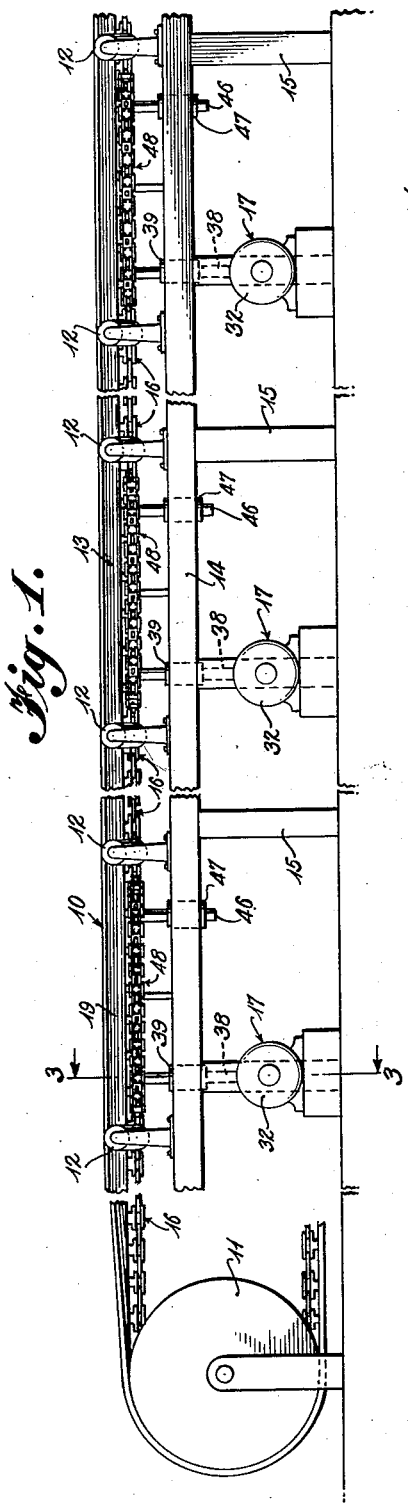
CARL F. LAUENSTEIN, INVENTOR,
DECEASED
JEAN W. LAUENSTEIN,
EXECUTRIX
BY
ATTORNEY

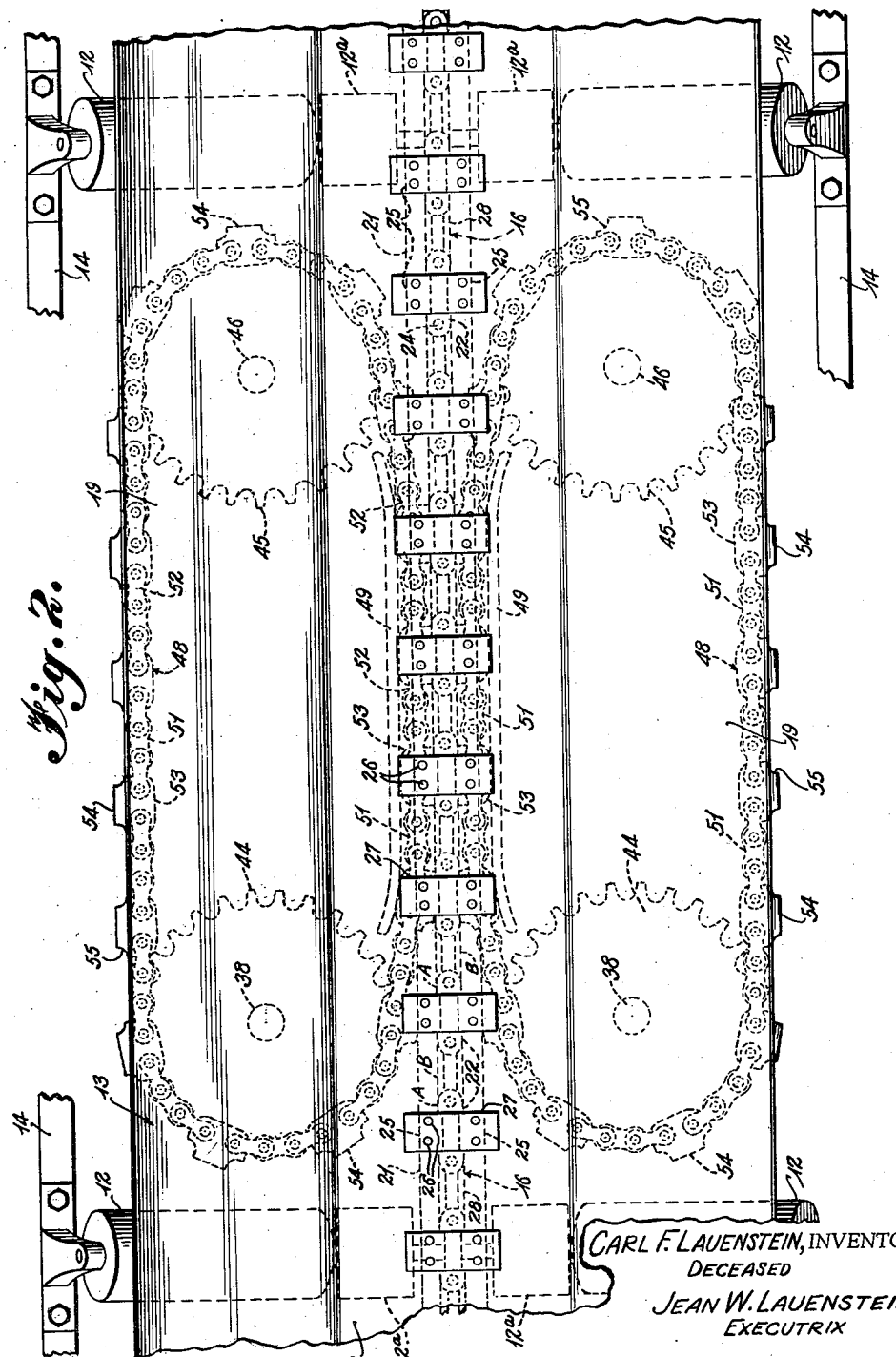

Aug. 21, 1956   C. F. LAUENSTEIN   2,759,595
BELT CONVEYOR
Filed Sept. 24, 1951   4 Sheets-Sheet 3
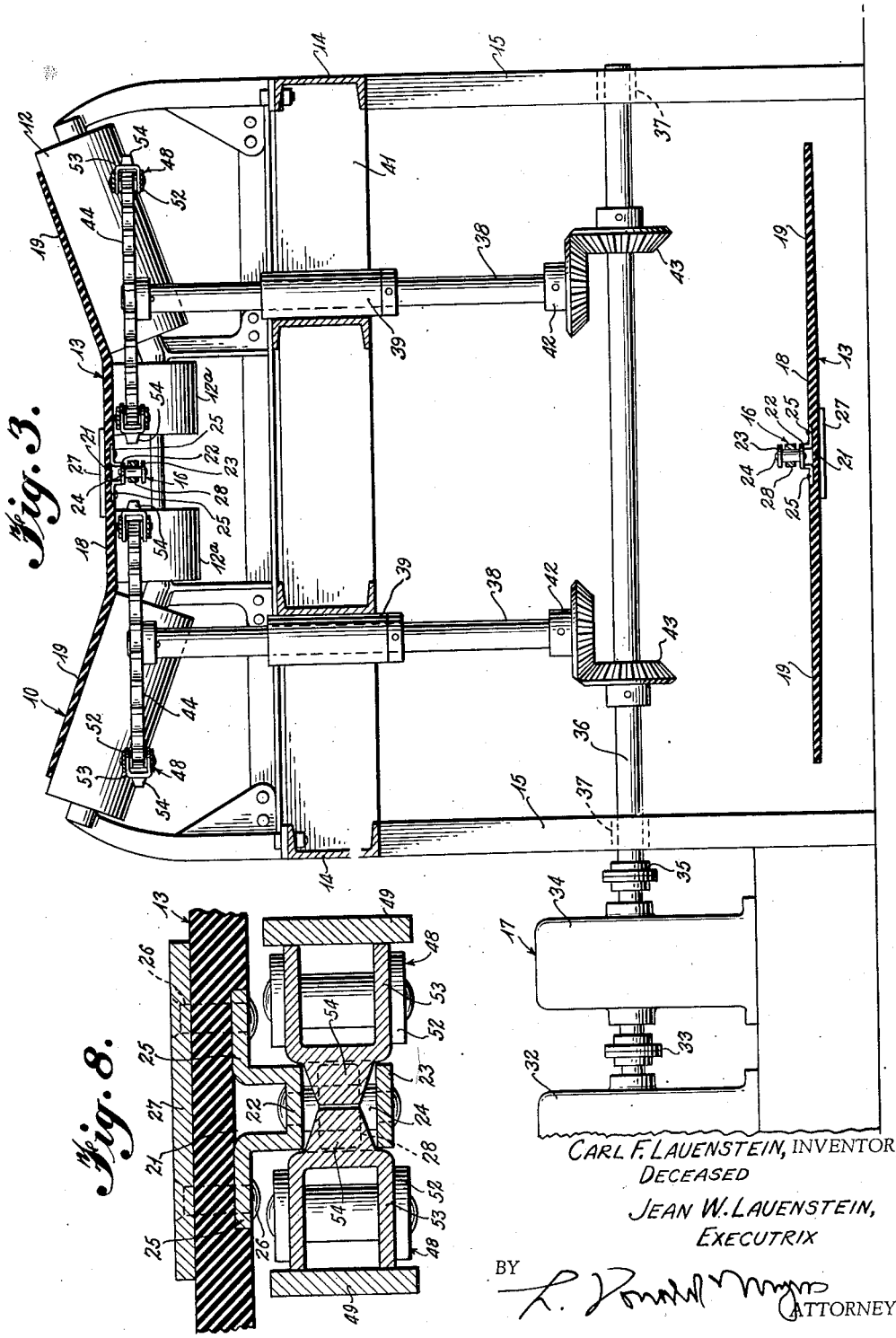
CARL F. LAUENSTEIN, INVENTOR,
DECEASED
JEAN W. LAUENSTEIN,
EXECUTRIX
BY
ATTORNEY

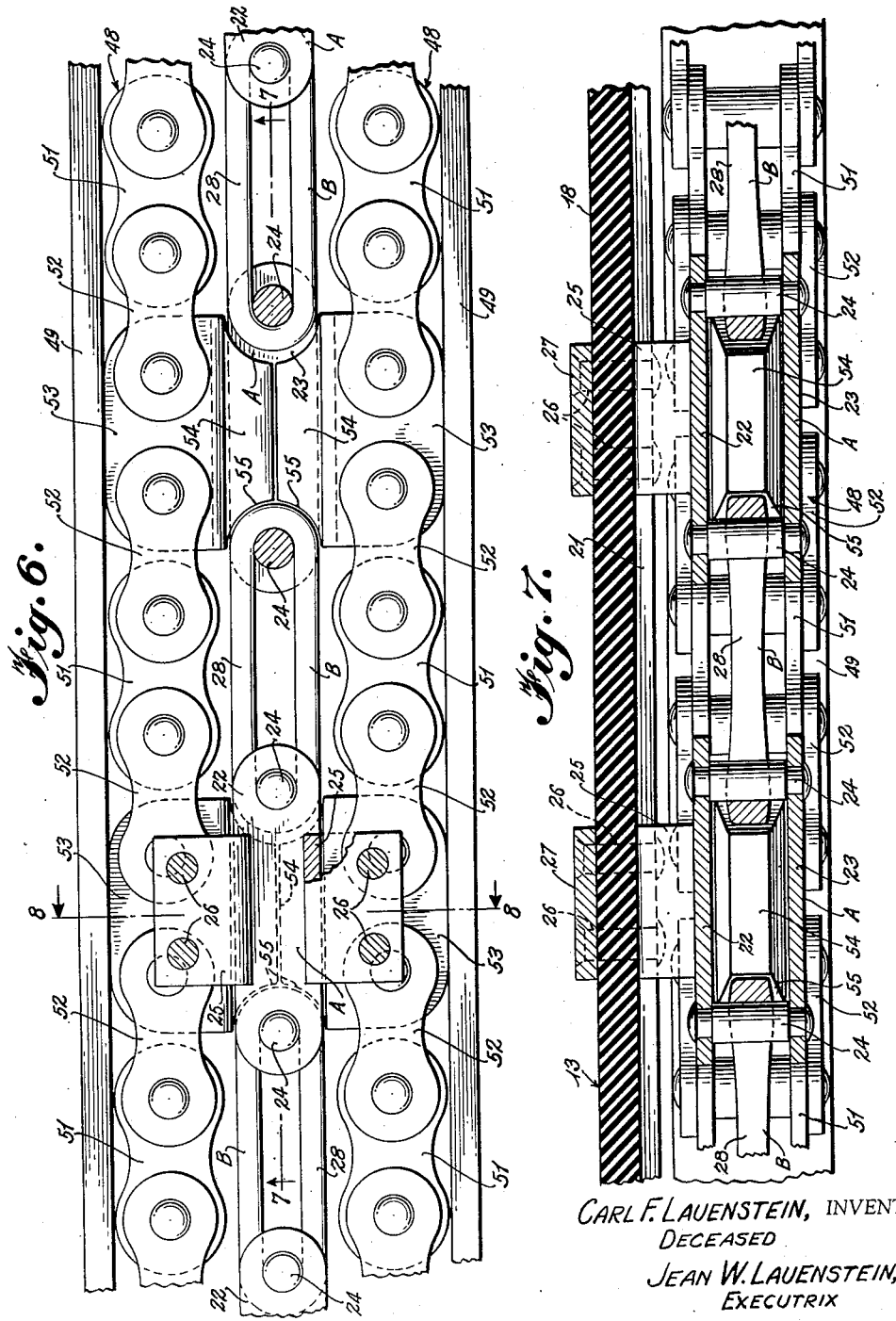

United States Patent Office 2,759,595
Patented Aug. 21, 1956

2,759,595

BELT CONVEYOR

Carl F. Lauenstein, deceased, late of Indianapolis, Ind., by Jean W. Lauenstein, executrix, Indianapolis, Ind., assignor to Link-Belt Company, a corporation of Illinois Application September 24, 1951, Serial No. 247,923

5 Claims. (Cl. 198—192)

This invention relates to new and useful improvements in belt conveyors and deals more particularly with the construction of a single endless belt conveyor which may be employed for transporting flowable solids over greater distances than has been possible heretofore.

During recent months, there has been a substantial amount of effort and research applied to the problem of developing a single endless belt conveyor which will be capable of moving materials over long distances. The most obvious difficulties which must be overcome are created by the need for providing the load conveying belt with sufficient strength to withstand the large tension forces which must be applied thereto in driving and in eliminating excessive sag in the belt, and for providing a form of drive which will be capable of applying the required amount of power to move the belt and its load.

It is possible at this time to manufacture a conveyor belt of conventional rubber covered, multiple ply construction which will possess sufficient strength to sustain the required tension forces for a total belt span of several thousand feet. However, the cost of the belt, due to the necessary requirements regarding width, number of plies and weight of duck, is prohibitive for most commercial installations.

It is the present practice to drive belt conveyors by applying the required horse power through frictional contact between the belt and either single or dual pulleys located at the discharge terminal of the belt path or in the return run. The most serious difficulty that is created by the use of such conventional drives for extremely long belt conveyors, is due to the fact that the total tension for the entire conveyor is concentrated in the portion of the belt approaching the single point of power application.

A further difficulty encountered in the use of conventional belt conveyor drives is caused by the limitation on the available driving forces that can be applied due to slippage between the pulley or pulleys and the belt. In other words, the efficiency of a frictional type conveyor drive is impaired by the application of such forces as will cause slippage between the surfaces which are in frictional contact. Further, the maximum force which may be transmitted without such relative movement will vary in accordance with variations in the coefficient of friction of the engaging surfaces so that under certain conditions the maximum force is insufficient for proper operation of the conveyor.

The primary object of this invention is to provide a belt conveyor and drive arrangement which eliminates the need for applying excessive tension forces to extremely long conveyor belts.

A further important object of the invention is to provide a belt conveyor and drive arrangement which substantially eliminates the tension forces in the belt regardless of the length of the conveyor or the weight of the material conveyed.

A further object of the invention is to provide a positive drive arrangement for a belt conveyor which eliminates the difficulties caused by slippage between the conveyor belt and a conventional pulley drive.

A still further object of the invention is to provide a belt conveyor which will have a substantially constant belt length under various load conditions to thereby reduce the takeup capacity that will be required for the conveyor.

Still another object of this invention is to provide a drive arrangement for belt conveyors which may be located at any point between the terminal pulleys of the conveyor and which will permit the entire load carrying surface of the belt to be utilized for conveying material.

A further important object of the invention is to provide a drive arrangement for conveyor belts which will positively maintain the belt in its properly centered position on the supporting idler rolls and terminal pulleys.

More specific objects of the invention are to provide a belt conveyor and drive arrangement comprising a substantially non-elastic tension member positioned inwardly of the non-load carrying surface of and connected to the belt and one or more drive units positively engaging the tension member to move the conveyor belt and to center the belt on its supporting idler rolls and terminal pulleys.

Other objects and advantages of the invention will be apparent during the course of the following description.

In the accompanying drawings forming a part of this specification and in which like reference characters are employed to designate like parts throughout the same, Figure 1 is a side elevational view, partly broken away, of a section of a belt conveyor embodying this invention, Figure 2 is an enlarged top plan view of one of the conveyor drive units illustrated in Fig. 1, Figure 3 is a vertical sectional view taken on the line 3—3 of Fig. 1, Figure 4 is a fragmentary side elevational view, partly broken away, illustrating the arrangement of the conveyor belt on a terminal pulley of the conveyor, Figure 5 is a transverse sectional view taken on line 5—5 of Fig. 4, Figure 6 is a horizontal sectional view illustrating the engagement between the belt chain and the cooperating drive chains, Figure 7 is a vertical sectional view taken on line 7—7 of Fig. 6, and Figure 8 is a transverse sectional view taken on line 8—8 of Fig. 6.

In the drawings, wherein for the purpose of illustration is shown a preferred embodiment of this invention, and first particularly referring to Fig. 1, reference character 10 designates a section of a belt conveyor which includes a terminal pulley 11 and a plurality of troughing idlers 12 for supporting the conveyor belt 13. Although only one terminal pulley is illustrated, it is to be understood that a second terminal pulley of identical construction will be provided at the other end of the conveyor path. The troughing idlers 12 are mounted in a conventional manner on longitudinal channel beams 14 at each side of the conveyor belt 13. The channel beams 14 in turn are supported by vertical posts 15 at longitudinally spaced points along the conveyor 10.

The tension forces which are applied in driving the conveyor belt 13 are carried by a tension member or chain 16 which is positioned inwardly of the non-load carrying surface of the belt and is connected to the belt along the longitudinal center line of the latter. Tension forces are applied to the chain 16 by individual drive units 17 which are positioned below and at longitudinally spaced intervals along the conveyor 10.

Referring now to Figs. 2 to 8, inclusive, for a detail description of the belt 13 and its attached chain 16, and first particularly referring to Fig. 3, it will be noted that the middle or untroughed portion 18 of the belt is of uniform thickness throughout its width while the troughed side portions 19 are uniformly tapered from the center portion 18 outwardly to the edges of the belt. Formed in the inner or non-load carrying surface of the belt 13 is a groove 21 which extends along the longitudinal center line of the belt for its entire length.

As is best illustrated in Figs. 4 to 8, inclusive, the chain 16 is formed with alternate pitches of outside and inside links A and B, respectively, with its outside links each connected to the belt 13. The outside links A of the chain 16 are each formed of an outer side plate 22, an inner side plate 23, and a pair of chain pins 24. Each of the outer side plates 22 is provided with two L-shaped, integral brackets 25 which are arranged so as to have their outer arms or branches extending in opposite directions and seated in the aforesaid groove 21 of the belt 13. The brackets 25, therefore, maintain the outer side plates 22 in an inwardly spaced position relative to the non-load carrying surface of the belt 13. The inner side plates 23 are spaced inwardly of and are connected to the outer side plates 22 by the chain pins 24 which are shouldered and peened over at their end portions to maintain the proper spacing between the side plates. Each outside link A of the chain 16 is connected to the belt 13 by rivets 26 which pass through the brackets 25, the belt 13, and a backing plate 27. The backing plates 27 are positioned on the load-carrying surface of the belt 13 and their end portions extend transversely beyond the outer ends of the brackets 25 for a purpose which later will be described.

Each inside link B of the chain 16 is formed of a one-piece body 28 having an elongated central opening therethrough for receiving at its opposite end portions the adjacent pins 24 of the outside links A. The pins 24 are free to move longitudinally in these central openings when the chain 16 is shortened and will engage the opposite ends of the central openings when the chain is pulled out to its full length.

The radial depth or thickness of each inside link body 28 is somewhat less than the spacing between the inner and outer side plates 23 and 22, respectively, of the outside links so that the link bodies may rock on the pins 24 to permit articulation between the connected links A and B when the chain 16 is trained over a terminal body. It also will be noted that when the chain 16 is trained over such a pulley the radius of curvature of the chain is smaller than that of the belt 13 so that the chain will be somewhat shortened while in such a position. This shortening of the chain 16 will cause longitudinal movement of the pins 24 in the central openings of the inside link bodies 28, as is best illustrated in Fig. 4.

Figs. 4 and 5 disclose the terminal pulley 11 as being provided with a centrally located circumferential groove 29 which provides clearance for the chain 16 as the belt 13 moves over the pulley. Fig. 5 shows the width of this groove to be such that the projecting ends of the backing plates 27 will be positioned so as to overlie the portions of the surface 31 of the pulley which are arranged on opposite sides of the groove to thereby support the chain 16. The troughing idlers 12 are provided with two relatively short, axially spaced center rolls 12a, as illustrated in Figs. 2 and 3, to provide clearance for movement of the chain 16 and to support the chain through the end portions of the backing plates 27.

Referring now to Figs. 1, 2, 3 and 6 to 8, inclusive, for a detail description of one of the drive units 17, and referring first particularly to Fig. 3, a motor 32 is connected through a coupling device 33 to the speed-reducer 34 which is in turn connected through a coupling device 35 to the shaft 36. This shaft is mounted in bearings 37 supported on the vertical posts 15 adjacent the drive unit 17 and extends transversely across the conveyor between the load carrying and return runs of the belt 13. Two vertical shafts 38 are supported in bearings 39 which are mounted on the transverse beam 41 extending between the channel beams 14 on opposite sides of the conveyor 10. Each of the shafts 38 extends from a point adjacent the shaft 36 upwardly to a point in horizontal alinement with the chain 16. The lower end portion of each of the shafts 38 has mounted thereon a bevel gear 42 which meshes with a bevel gear 43 mounted on the shaft 36. Rotation of the shaft 36 will, therefore, rotate the shafts 38 in opposite directions. Mounted on the upper end portion of each of the shafts 38 is a sprocket wheel 44 the periphery of which extends into closely spaced relationship with the chain 16.

Figs. 1 and 2 show a second sprocket 45 mounted in horizontal alinement with and at a longitudinally spaced location from each sprocket 44 by a rotatable shaft 46 which is supported in its vertical position by a bearing 47.

A drive chain 48 is trained over each of the sprockets 44 and the longitudinally spaced sprocket 45 on the corresponding side of the chain 16. The inner run of each drive chain, between the sprockets 45 and 44, is held in meshing relation to the chain 16 by a back-up bar 49.

As is best illustrated in Figs. 6 to 8, inclusive, each of the drive chains 48 substantially is of standard roller chain construction, having alternate pitches formed by roller links 51 and connecting links 52. Drive links 53 are connected into each drive chain 48 at properly spaced intervals along its length to mesh with the outside links A of the chain 16. Each of the drive links 53 is formed with a dog 54 having rounded end surfaces 55 for engagement with the end surfaces of the inside links B of the chain 16. The spacing between the drive chains 48 on opposite sides of the chain 16 is determined by the distance between the back-up bars 49 and is such that the dogs 54 enter the spaces between the inner and outer side bars 23 and 22, respectively, of the outside links A and are closely adjacent to each other.

When the conveyor 10 is placed in operation, the drive units 17, acting through the pairs of opposed drive chains 48, apply the driving force to the chain 16 by positive engagement therewith. The tension forces necessary to impart movement to the belt 13, therefore, are substantially entirely carried by the chain 16 so that the only loads acting upon the belt 13, disregarding friction, are due to the weight of the conveyed material between the idlers 12. This very substantial reduction of tension forces in the belt 13 permits the use of a much lighter and less expensive belt construction than would be required if the belt carried the entire tension forces. The tapering of the belt edge portions 19, also, reduces the weight of the belt so that the total reduction in belt weight will more than compensate for the weight of the chain 16. It also will be noted that the positive driving engagement between the chains 48 and 16 eliminates any variables in the speed or capacity of the conveyor 10 which would result from variations in the co-efficient of friction between a conveyor belt and a pulley type of drive unit.

By its cooperation with the opposed drive chains 48, the chain 16 automatically will maintain the conveyor belt 10 in its properly centered position relative to the troughing idlers 12 and terminal pulley 11. In other words, the gripping of the chain 16 between the opposed runs of the drive chains 48 of successive drive units 17 will positively maintain the belt 13 centered at all times.

It will be appreciated that the number of drive units 17 employed in a given conveyor installation will depend entirely upon the length of the conveyor and the anticipated loads to which it will be subjected. This permissible variation in the number of drive units 17 to be employed makes possible the installation of conveyors having overall lengths, or distances between terminal pulleys, which greatly exceed the permissible lengths of belt conveyors which are driven by friction types of drive devices. The permissible latitude in the number of drive units 17 to be employed also makes possible the arrangement of the drive units in such a manner as will permit disassociation of various ones of the drive units from the conveyor for maintenance or other purposes without disrupting the operation of the conveyor.

It is to be understood that the form of this invention herewith shown and described is to be taken as a preferred example of the same, and that various changes in the shape, size, and arrangement of parts may be resorted to without departing from the spirit of the invention or the scope of the subjoined claims.

What is claimed is:

1. A belt conveyor, comprising an endless flexible conveying belt providing a continuous load carrying surface, an endless tension member, means for rigidly connecting the tension member to the conveyor belt only at locations spaced longitudinally along the center line of the belt with the tension member positioned inwardly of the non-load carrying surface of said belt, terminal pulleys for supporting and training the said belt to form an active run and a return run, spaced idlers formed of angularly arranged rolls for supporting substantially the entire width and for troughing the active run of the conveying belt, and means in direct driving engagement with the tension member only at the locations of rigid connection with the endless conveying belt for directly driving the belt through said rigid connections.

2. A belt conveyor as defined in claim 1 further characterized by the terminal pulleys providing belt engaging surfaces that are interrupted to form circumferential spaces to accommodate the tension member as the conveying belt travels around said pulleys.

3. A belt conveyor as defined in claim 1 further characterized by the central portion of the troughed active run of the belt being supported by two rolls of each idler that are axially spaced to accommodate the tension member therebetween.

4. A belt conveyor as defined in claim 2 further characterized by the central portion of the troughed active run of the conveying belt being supported by two rolls of each idler that are axially spaced to accommodate the tension member therebetween.

5. A conveying belt as defined in claim 4 further characterized by the means for positively connecting the tension member to the conveying belt comprising spaced brackets carried by the tension member and engaging the non-load carrying surface of the conveying belt, a backing plate engaging the load carrying surface of the conveying belt opposite each one of the spaced brackets, said backing plates extending beyond both sides of their opposed brackets so that the opposite end portions of the backing plates will overlie the surfaces of the terminal pulleys on opposite sides of the circumferential spaces and the adjacent end portions of the axially spaced idler rolls supporting the central portion of the conveying belt, and fastening means passing through the brackets, their opposed backing plates and the conveying belt.

References Cited in the file of this patent

UNITED STATES PATENTS

| | | |
|---|---|---|
| 636,557 | Reeves | Nov. 7, 1899 |
| 1,817,970 | Da Costa | Aug. 11, 1931 |
| 2,080,828 | Mastin | May 18, 1937 |
| 2,219,724 | Quick | Oct. 29, 1940 |
| 2,435,694 | Pearson | Feb. 18, 1948 |
| 2,594,342 | Pettyjohn | Apr. 29, 1952 |